Sept. 20, 1966  R. L. MERRELL ETAL  3,273,822
SEAT BELT RETRACTOR
Filed April 15, 1964
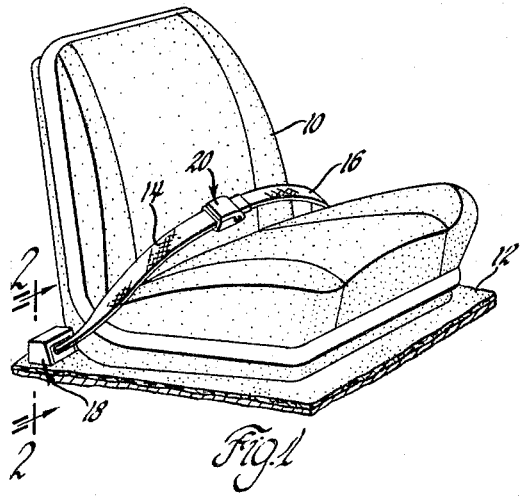
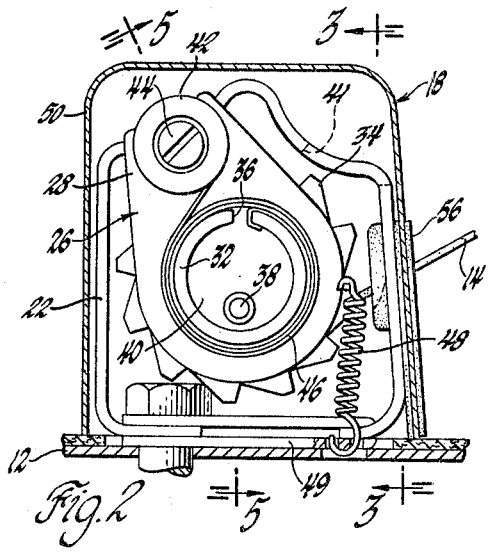
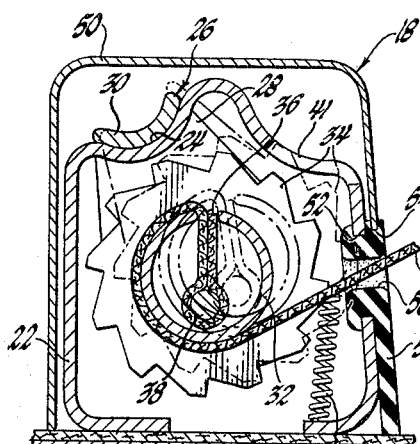
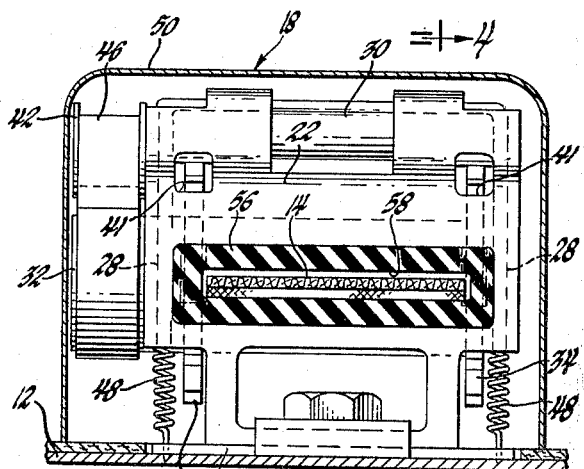
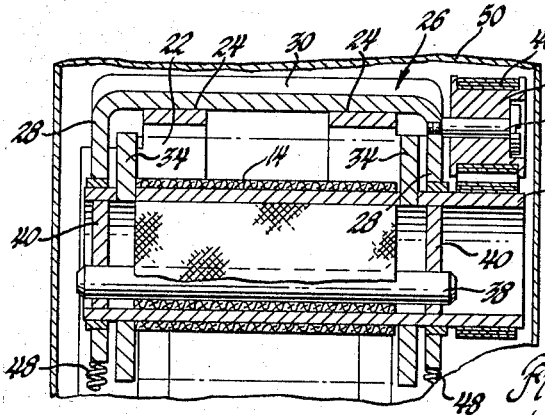
INVENTORS
Richard L. Merrell &
BY Angelo J. Misenti
ATTORNEY 3,273,822
SEAT BELT RETRACTOR
Richard L. Merrell, Simsbury, and Angelo J. Misenti, Bristol, Conn., assignors to General Motors Corporation, Detroit, Mich., a corporation of Delaware
Filed Apr. 15, 1964, Ser. No. 359,829
1 Claim. (Cl. 242—107.4)

This invention relates in general to safety devices and more particularly to a safety reel device adapted for use with motor vehicle seat belt assemblies for automatically retracting the belt when not in use and for automatically locking the seat belt under predetermined conditions.

Basically, the purpose of a motor vehicle seat belt assembly is to restrain movement of the passenger in the event of a collision or sudden stopping of the vehicle. Conventionally, the assembly comprises a pair of belt straps secured to the vehicle on either side of the passenger's seat and adapted to be fastened together around the waist of the passenger. In order to be effective, the seat belt should be adjusted so that it fits rather snugly. While the passanger is protected during a collision, he is also prevented from making such ordinary movement as reaching into the glove compartment or into the rear seat or to remove change from his pockets. A second objection to the conventional seat belt assembly has been the usually disorderly and unkept appearance of the belt strap when not in use. Accordingly, it has been suggested that a device be provided for retracting the belt to an appropriate location when not in use while permitting the passenger a certain amount of freedom of movement while the belt is in use and for automatically locking the seat belt in position when the vehicle is subjected to rapid deceleration. The present invention represents an improvment in such devices.

In general the present invention comprises reel means which are both rotatably and pivotally mounted on support means located within the motor vehicle, with the reel means and support means including cooperating locking means adapted to be engaged to prevent rotation of the reel means in response to a predetermined acceleration of the rotation of the reel means in an unwinding direction or in the event of a predetermined deceleration of the vehicle.

More specifically, the present invention provides a seat belt retractor including a minimum number of parts which are easily assembled comprising a spool which is rotatably mounted in a yoke which is pivotally mounted on a support member secured to the vehicle. Means are provided for quickly and easily coupling one end of the seat belt to the reel and a spring motor is provided for normally rotating the reel in a direction to wind the seat belt thereon. The reel is further provided with toothed wheels adapted to engage the support member when a sudden force is applied to the seat belt to prevent rotation of the reel in an unwinding direction.

A more complete understanding of the present invention may be had from the following detailed description which should be taken in conjuction with the drawings in which:

FIGURE 1 is a perspective view showing the retractable assembly of the present invention mounted in a motor vehicle;

FIGURE 2 is a sectionl view taken along lines 2—2 of FIGURE 1;

FIGURE 3 is a sectional view taken along lines 3—3 of FIGURE 2;

FIGURE 4 is a sectional view taken along lines 4—4 of FIGURE 3 and showing the retractor in both normal and locked position; and FIGURE 5 is a sectional view taken along lines 5—5 of FIGURE 2.

Referring now to the drawings and initially to FIGURE 1, the reference numeral 10 designates an automobile seat suitably mounted to the vehicle floor 12. A seat belt assembly comprises a pair of seat belt straps 14 and 16, respectively, coupled at one end to a retracting device generally designated 18 while the opposite ends are suitably secured to cooperating buckle members generally designated 20.

Referring now to FIGURES 2–5, the seat belt retractor 18 comprises a support member 22 which is suitably secured to the vehicle floor 12 and includes arcuate support surfaces 24. A U-shaped support member or yoke 26 including arms 28 extending from an arcuate shaped portion 30 is adapted for pivotal movement relative to the support member 22 by sliding engagement of the portion 30 with the surfaces 24. A hollow reel 32 is rotatably supported by the yoke 26 and includes a pair of toothed wheels 34 suitably attached thereto or forming an integral part thereof. The belt strap 14 extends through a slot 36 in the reel 32 and is adapted to receive a belt retaining pin 38 which is supported within the reel 32 by circular spacers 40. The toother wheels 34 are adapted to be extended through slots 41 in the support member 22 when the reel 32 is pivoted to the position shown in phantom in FIGURE 4.

As best shown in FIGURE 5, a spool 42 is rotatably mounted on a pin 44 which is secured to the yoke 26. A spring 46 is prestressed so as to tend to coil itself tightly around the spool 42. The outer end of the spring 46 is secured to the reel 32 and is arranged to be reversely wound thereon. A pair of coil springs 48 connected between the yoke 26 and the base plate 49, which is sandwiched between the support member 22 and the floor 12, normally maintains the yoke 26 in the position shown in FIGURE 2. A housing 50 is adapted to be received over the support member 22 to form an enclosure for the retractor. The support member 22 and the housing 50 are provided with aligned openings 52 and 54. A guide member 56 is adapted to be received in the openings 52 and 54 and includes a slot 58 through which the belt strap 14 passes.

The operation of the device is as follows. The spring 46 normally tends to rotate the reel 32 in a clockwise or winding direction as viewed in FIGURES 2 and 4, the unwinding direction of the reel 32 being counterclockwise and accomplished by tensioning the belt strap 14 in excess of the rewinding force of spring 46.

When no unwinding force is being applied to the belt strap 14, the parts will assume the position shown in FIGURE 2 where the toothed wheels 34 are held in a position by the springs 48 which allow for free rotation of the reel 32. Under normal movement of the vehicle passenger, the tension of the springs 48 is selected to prevent pivoting of the yoke 26 through an angle sufficient to cause engagement of the toothed wheels 34 with the support member 22 and therefore the reel 32 may be rotated in an unwinding direction as the passenger moves forward and will rewind as he moves backward.

Since the belt strap 14 is directly coupled to the reel 32, the rate of rotation of the reel in an unwinding direction is directly dependent upon the speed with which the belt is unwound from the reel. It will be understood that up to a predetermined acceleration of the reel 32 in an unwinding direction, the toothed wheels 34 will be held in the position shown in FIGURE 2 by the springs 48. However, if the motor vehicle is suddenly decelerated as in a collision or sudden stopping of the vehicle, the seat belt wearer will be thrown forward with the result that a sudden force is applied to the belt strap 14 and the reel 32 will be accelerated. At a predetermined acceleration, the inertia of the rotating parts, which must be overcome before rotation occurs, is greater than the force resisting pivotal movement of the yoke 26. Consequently, the yoke 26 will be pivoted to the position shown in the phantom lines in FIGURE 4 where the toothed wheels 34 engage the support member 22 thus preventing any further rotation of the reel 32 is a counterclockwise or unwinding direction.

While the invention has been described with respect to a particular embodiment, it is not to be construed in a limiting sense. Many variations and modifications within the spirit and scope of the invention will now occur to those skilled in the art. For a definition of the invention, reference is made to the appended claim.

We claim:

An inertia operated seat belt retractor adapted to be mounted in a motor vehicle comprising a housing,
- a U-shaped yoke member having an arcuate surface portion extending between a pair of transversely extending arms,
- a support member secured to said vehicle within said housing for supporting said U-shaped yoke member and including an arcuate surface portion in sliding engagement with the arcuate surface portion of said yoke member,
- a hollow reel rotatably journalled between the arms of said yoke member,
- a seat belt retaining pin supported within said reel between a pair of spacers,
- said spacers engaging the inner surface of said hollow reel to maintain said pin substantially immovable in a direction transverse to the axis of said reel,
- said pin being movable parallel to the axis of said reel for reception by a loop formed in one end of a seat belt to couple the seat belt to the reel,
- said support member and said housing being provided with aligned openings,
- a non-metallic guide member mounted in said opening and including a slot for receiving said seat belt,
- a spool rotatably supported in said yoke,
- a flat spring having one end secured to said spool and the other end secured to said reel and normally being wound on said spool but adapted to be backwound on said reel when said reel is rotated in an unwinding direction,
- a pair of toothed wheels rotatable with said reel,
- a plurality of apertures formed in said support member located in the path of arcuate movement of said yoke member for receiving a portion of said toothed wheels to prevent rotation of said wheels in response to a predetermined sliding movement of said yoke member,
- a coil spring connected between each of said arms and said support member for normally, yieldingly biasing said toothed wheels out of engagement with said support member to permit free rotation of said reel in a winding and unwinding direction.

References Cited by the Examiner
UNITED STATES PATENTS

| | | | |
|---|---|---|---|
| 3,074,761 | 1/1963 | Ryan | 297—388 |
| 3,137,526 | 6/1964 | Carreberg | 297—388 |
| 3,138,406 | 6/1964 | Hanway | 242—107.4 X |
| 3,174,704 | 3/1965 | Replogle | 242—107.4 |

FRANK J. COHEN, *Primary Examiner.*

MERVIN STEIN, *Examiner.*

W. S. BURDEN, *Assistant Examiner.*